US009885291B2

United States Patent
Lecordix et al.

(10) Patent No.: US 9,885,291 B2
(45) Date of Patent: Feb. 6, 2018

(54) TURBOMACHINE COMPRISING A PLURALITY OF FIXED RADIAL BLADES MOUNTED UPSTREAM OF THE FAN

(71) Applicant: SNECMA, Paris (FR)

(72) Inventors: Jean-Loic Herve Lecordix, Blandy les Tours (FR); Nils Bordoni, Melun (FR)

(73) Assignee: SNECMA, Paris (FR)

( * ) Notice: Subject to any disclaimer, the term of this patent is extended or adjusted under 35 U.S.C. 154(b) by 341 days.

(21) Appl. No.: 14/626,507

(22) Filed: Feb. 19, 2015

(65) Prior Publication Data

US 2016/0069275 A1   Mar. 10, 2016

Related U.S. Application Data

(63) Continuation-in-part of application No. 14/418,670, filed as application No. PCT/FR2013/051818 on Jul. 29, 2013.

(30) Foreign Application Priority Data

Aug. 9, 2012   (FR) ..................................... 12 57742

(51) Int. Cl.
   *F01B 25/00*   (2006.01)
   *F02C 9/22*   (2006.01)
   (Continued)

(52) U.S. Cl.
   CPC .............. *F02C 9/22* (2013.01); *F01D 17/162* (2013.01); *F02K 3/06* (2013.01); *Y02T 50/671* (2013.01)

(58) Field of Classification Search
   CPC .. F01D 17/162; F04D 29/563; F05D 2220/36; Y02T 50/671; F02K 3/06; F02C 9/22; F02C 7/042; F02C 9/20
   (Continued)

(56) References Cited

U.S. PATENT DOCUMENTS 3,299,638 A * 1/1967 Santamaria ......... B64C 29/0025
                                                    239/265.19
3,861,822 A * 1/1975 Wanger ................. F04D 29/563
                                                    415/147
(Continued)

FOREIGN PATENT DOCUMENTS

DE           767 258 C      5/1952
FR         2 360 758 A1     3/1978
(Continued)

OTHER PUBLICATIONS

U.S. Appl. No. 14/626,452, filed Feb. 19, 2015, Lecordix, et al.
(Continued)

*Primary Examiner* — Jessica Cahill
(74) *Attorney, Agent, or Firm* — Oblon, McClelland, Maier & Neustadt, L.L.P.

(57) ABSTRACT

A bypass turbine engine including: an inner casing, an inter-duct casing, and an outer casing so as to define a primary duct between the inter-duct casing and the inner casing, and a secondary duct between the inter-duct casing and the outer casing; a rotary shaft including a movable fan including radial blades of which free ends face the outer casing of the turbine engine to compress an air flow in the secondary duct; a plurality of variable-pitch radial stator vanes mounted upstream of the movable fan so as to deflect the incident axial air prior to it being axially rectified by the movable fan in the secondary duct; and a system for individually regulating the pitch of the variable-pitch radial vanes if heterogeneity of the air flow in the secondary duct is detected, is provided.

22 Claims, 8 Drawing Sheets

(51) Int. Cl.
   *F02K 3/06* (2006.01)
   *F01D 17/16* (2006.01)
(58) Field of Classification Search
   USPC ......................................................... 415/144
   See application file for complete search history.

(56) References Cited

U.S. PATENT DOCUMENTS

| | | | |
|---|---|---|---|
| 4,072,008 A | | 2/1978 | Kenworth et al. |
| 4,080,785 A | | 3/1978 | Koff et al. |
| 4,222,234 A | | 9/1980 | Adamson |
| 4,254,619 A | | 3/1981 | Giffin, III et al. |
| 4,400,135 A | * | 8/1983 | Thebert .................. F01D 17/162 415/134 |
| 5,692,879 A | * | 12/1997 | Charbonnel .......... F04D 29/563 415/159 |
| 5,993,152 A | * | 11/1999 | Schilling ............... F01D 17/162 415/155 |
| 8,690,521 B2 | * | 4/2014 | Colotte .................. F01D 17/16 415/149.4 |
| 2006/0263206 A1 | * | 11/2006 | Bouru .................. F01D 17/162 415/159 |
| 2008/0069687 A1 | * | 3/2008 | Lace ..................... F01D 17/162 415/145 |
| 2009/0297334 A1 | * | 12/2009 | Norris ..................... F01D 17/08 415/49 |

FOREIGN PATENT DOCUMENTS

| | | |
|---|---|---|
| FR | 2 398 890 A1 | 2/1979 |
| FR | 2 424 999 A1 | 11/1979 |
| FR | 2 688 827 A1 | 9/1993 |

OTHER PUBLICATIONS

International Search Report dated Nov. 22, 2013 in PCT/FR2013/051818 filed Jul. 29, 2013.
"Kusnezow NK-93", Wikipedia, XP055061226, Jul. 24, 2012, 3 Pages http://de.wikipedia.org/w/index.php?title=Kusnezow_NK-93&oldid=105952941.

* cited by examiner

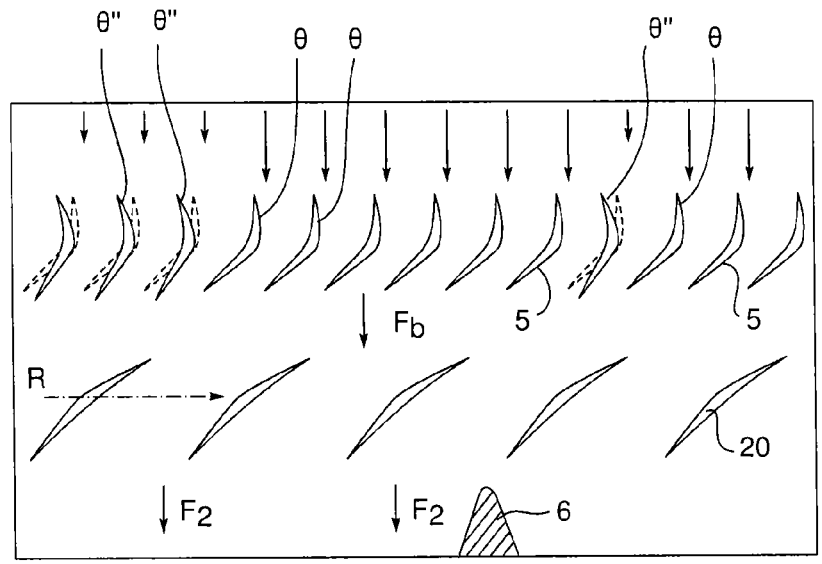
Figure 6
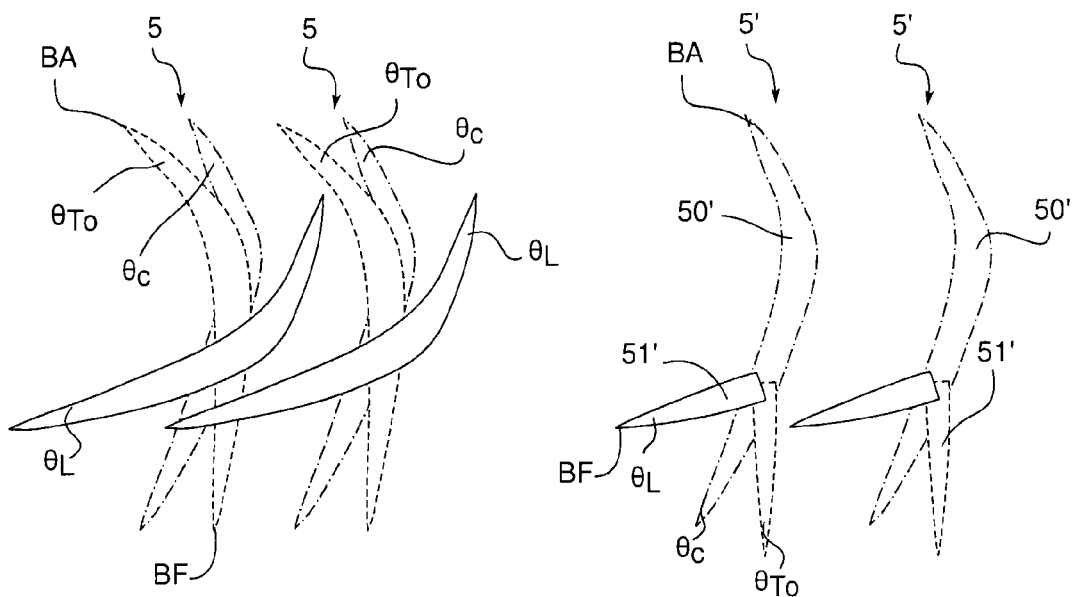
Figure 7AFigure 7B

TURBOMACHINE COMPRISING A PLURALITY OF FIXED RADIAL BLADES MOUNTED UPSTREAM OF THE FAN

GENERAL TECHNICAL FIELD AND PRIOR ART

The present invention relates to the field of bypass turbine engines, in particular for an aircraft, in which air flows circulate from upstream to downstream.

FR2902142 by SNECMA discloses such a turbine engine. Conventionally, with reference to FIG. 1, the turbine engine 1 extends axially along an axis X-X and comprises an inner casing 11, an inter-duct casing 12 and an outer casing 13 so as to define a primary duct V1 between the inter-duct casing 12 and the inner casing 11, and a secondary duct V2 between the inter-duct casing 12 and the outer casing 13. In other words, the secondary duct V2 and the primary duct V1 are annular and are separated by the inter-duct casing 12.

The turbine engine 1 comprises a rotary shaft comprising, at the upstream end, a movable fan 2 for compressing an incident air flow F, the movable fan 2 comprising radial blades 20 of which the free ends face the outer casing 13 of the turbine engine 1 so as to compress an air flow at least in the secondary duct V2 and, preferably, also in the primary duct V1. Conventionally, the turbine engine 1 is referred to as a ducted-fan turbine engine.

The air flow circulating in the primary duct V1 is conventionally compressed by compressor stages of the turbine engine 1 before entering the combustion chamber. The combustion energy is recovered by turbine stages which are involved in driving the compressor stages and the upstream movable fan 2. The air flow circulating in the secondary duct V2 for its part is involved in providing the thrust of the turbine engine 1.

Conventionally, the secondary duct V2 comprises, downstream of the movable fan 2, fixed radial vanes or stator vanes 3, known to a person skilled in the art as outlet guide vanes (OGV), for rectifying the air flow $F_0$ deflected by the movable fan 2 during its rotation. In a similar manner, the primary duct V1 comprises, downstream of the movable fan 2, fixed radial vanes or stator vanes 4, known to a person skilled in the art as inlet guide vanes (IGV). "Fixed vane" or "stator vane" means a vane which is not driven in rotation about the axis X-X of the turbine engine 1, that is to say by contrast with a movable blade or rotor blade of a rotor stage of the turbine engine 1.

The invention more particularly relates to turbine engines having a high bypass ratio, that is to say a ratio of deflection of air in the secondary duct V2 that is high compared with the air flow deflected in the primary duct V1. The bypass ratio (BPR) is known to a person skilled in the art and depends on the configuration of the casings 11, 12, 13 of the turbine engine (diameter, radial spacing, etc.). In the following, a "high" bypass ratio means a bypass ratio of greater than 15. In other words, for such a turbine engine 1, the flow rate of air in the secondary duct V2 is 15 times greater than the flow rate of air in the primary duct V1.

A turbine engine 1 having a high bypass ratio advantageously allows a high level of thrust to be obtained with reduced fuel consumption.

Nevertheless, the more the dimensions of the secondary duct V2 are increased, the more the diameter of the outer casing 13 is increased, which presents major drawbacks in terms of mass and drag. Another drawback of turbine engines having a high bypass ratio is that it is necessary to increase the dimensions and the mass of the thrust reversers.

In addition, a main object of the invention is to propose a turbine engine which has reduced consumption and of which the mass is also reduced.

Moreover, the greater the diameter of the outer casing 13, the greater the length of the blades 20 of the movable fan 2. In practice, for a rotational speed of the blades 20 of approximately 400 m/s, the air flow deflected by the ends of the blades 20 may reach supersonic speeds of approximately Mach 1.3, which presents drawbacks in terms of acoustics. In addition, a high speed of the air flow $F_0$ deflected by the movable fan 2 generates shockwaves in the turbine engine 1, causing a reduction of the compression efficiency. After the air flow is deflected by the movable fan 2, the air flow $F_0$ deflected in the secondary duct V2 has an axial and tangential component and needs to be rectified axially by the fixed radial vanes 3 of the OGV type. The tangential component added to the axial component of the air flow $F_0$ deflected in the secondary duct V2 by a vane 20 having a large diameter may be a source of noise in a turbine engine 1.

A further object of the invention is to propose a turbine engine having limited acoustic impact.

BRIEF DESCRIPTION OF THE INVENTION

In order to overcome some of these drawbacks, the invention relates to a bypass turbine engine, in particular for an aircraft, in which air flows circulate from upstream to downstream, the turbine engine extending axially and comprising an inner casing, an inter-duct casing and an outer casing so as to define a primary duct between the inter-duct casing and the inner casing, and a secondary duct between the inter-duct casing and the outer casing, a rotary shaft comprising, at the upstream end, a movable fan comprising radial blades of which the free ends face the outer casing of the turbine engine so as to compress an air flow at least in the secondary duct, the turbine engine comprising a plurality of variable-pitch radial stator vanes mounted upstream of the movable fan, the variable-pitch radial vanes being configured to deflect the incident axial air and the movable fan being configured to axially rectify said air deflected in the secondary duct, and means for individually regulating the pitch of the variable-pitch radial stator vanes if heterogeneity of the air flow in the secondary duct is detected.

The presence of radial stator vanes upstream of the movable fan advantageously allows the axial incident air flow to be deflected prior to being rectified by the movable fan, so that the direction of the air flow downstream of the movable fan is solely axial. In addition, it is no longer necessary to resort to fixed guide vanes or stator vanes downstream of the fan, and this makes the turbine engine lighter.

Owing to the variable pitch of the radial stator vanes, the incident air flow is adapted to the requirements of the turbine engine, that is to say to its operating state. In addition, in a given pitch position, the radial stator vanes allow an airbrake function to be provided. The turbine engine thus does not need a thrust reverser connected to the turbine engine, and this reduces its mass and complexity.

The individual-regulating means comprise means for individually adjusting the pitch of the radial vanes which advantageously allow, depending on the configuration of the turbine engine, the pitch of certain variable-pitch radial vanes to be locally modified to allow, for example, a greater amount of air to circulate and to thus compensate the presence of an element blocking the circulation of air downstream of the movable fan.

In addition, the individual-regulating means provide the option of actuating the adjustment means in order to differentiate the variations in pitch of the radial vanes, at least to a certain extent, depending on whether heterogeneity of the air flow in the secondary duct is detected. Therefore, if a crosswind or boundary layer ingestion is detected, the air flow in the secondary duct is re-homogenised and adapted to the incidence of the movable blades by providing an individual pitch for each variable-pitch radial vane in order to limit the risk of a surge in the turbine engine.

The action of the individual-regulating means leads to it being possible for at least two stator vanes of a plurality of stator vanes of a rectifier, for example, to have a pitch which is different in value and/or in variation range.

Advantageously, the means for individually regulating the pitch of the radial vanes comprise at least two control rings and an assembly of at least two rods for connecting said first and second control rings to each of said radial vanes.

The system for regulating the pitch of the vanes using at least two control rings makes it possible to change the pitch of the vanes using different laws according to their azimuth position.

Advantageously, the number of control rings is limited to two, thereby limiting the complexity of the regulating system and improving the reliability. Moreover, the fact that there are a plurality of connecting rods for each vane allows, by changing the geometry thereof, the dependency of the variations in pitch to be adjusted differently for each vane using movements of the control rings. Such a system may be used, for example to correct the effects of a crosswind or of an increase in incidence during take-off, by being adapted so that the pitch of each vane changes in accordance with a relationship which depends on its azimuth position using the control of a first ring, while maintaining the capacity to adapt the pitch of all of the vanes to the flight phases using the control of a second ring. In the case of a bypass turbojet engine, in particular, an increase in the performance of the rectifier upstream of the fan may allow the length of the air inlet which is usually provided to be reduced in order to homogenise the secondary flow before it reaches the fan propeller. In addition, and as stated above, since it is possible to modify the pitch of the variable-pitch radial vanes in order to use said vanes as air brakes, the nacelle may also be shortened in the downstream direction by limiting said nacelle to its function of fairing the fan propeller without a thrust-inversion device being installed here. It is thus possible to significantly shorten the nacelle of the turbine engine.

Preferably, the variable-pitch radial vanes have an aerodynamic profile so as to accelerate the incident air flow when it is being deflected by the variable-pitch radial vanes. In other words, the variable-pitch radial vanes allow a laminar flow of the air flow. Preferably, the aerodynamic profile of the vanes allows an acceleration of the air flow over at least 75% of the chord.

Preferably, the inner casing, the inter-duct casing and the outer casing are at a radial distance from one another in the turbine engine so as to define a turbine engine having a bypass ratio that is greater than or equal to 15. Preferably, the rotational speed of the free ends of the blades of the movable fan is less than 340 m/s. For turbine engines having a high bypass ratio, they may benefit from a high level of thrust for a movable fan driven at a slow speed, that is to say less than 340 m/s. Advantageously, high speeds are prevented from occurring when air is being deflected by the blades of the fan. Owing to the invention, the noise of turbine engines having a high bypass ratio is limited by taking advantage of the slow speed of the movable fan.

According to a preferred aspect of the invention, the plurality of variable-pitch radial vanes extend in the same plane which is transverse to the axis of the turbine engine in order to allow homogenous deflection of the incident air flow prior to it being rectified by the movable fan.

Preferably, the axial distance between the plurality of variable-pitch radial vanes and the movable fan is between 0.1 and 10 times the mean chord of a variable-pitch radial vane so as to optimise the rectification while limiting the length of the turbine engine and its nacelle.

According to the invention, the turbine engine does not comprise stator vanes mounted in the secondary duct downstream of the movable fan. The air flow deflected by the movable fan is axially rectified and does not require the presence of downstream radial vanes, and this reduces the mass and complexity of the turbine engine. In a similar manner, according to a preferred aspect of the invention, the turbine engine does not comprise stator vanes mounted in the primary duct downstream of the movable fan.

The radial stator vanes which are capable of rectifying a flow in a duct are distributed in a ring in rectifier modules. It is in particular possible to distinguish such rectifier modules from structural, non-rectifier, modules, comprising radial arms between the casings, by the following features:

there are at least twenty radial arms or radial vanes in a rectifier module, whereas the structural modules have at most fourteen radial arms;

if an aerodynamic criterion is considered, which is referred to as spacing and is defined by the ratio of the chord length of the radial arms or vanes to the distance between two adjacent arms or vanes at the tip, the spacing value is greater than 0.8 for a rectifier module, whereas it is less than 0.5 for a non-rectifier module; and the angle of incidence that the radial vanes of a rectifier module have by following the shaft of the turbine engine depends on the fan propeller, but must be at least 15° to have a rectifying effect, while normally remaining less than 65°.

According to an aspect of the invention, the blades of the movable fan extend only between the inner casing and the outer casing of the turbine engine.

According to another aspect of the invention, the blades of the movable fan extend between the inter-duct casing and the outer casing of the turbine engine.

Preferably, the variable-pitch radial vanes are adapted, in a given pitch position, to block the circulation of air in the secondary duct and to permit the circulation of air in the primary duct.

Still preferably, each variable-pitch radial vane has an aerodynamic profile so as to accelerate the incident air flow in accordance with a laminar flow.

Preferably, each variable-pitch radial vane has a body which is movable in rotation about a radial axis so as to maintain an identical profile for each operating state of the turbine engine. An integral radial vane of this type is simple to manufacture.

According to another aspect of the invention, each variable-pitch radial vane has a fixed body and a movable flap, only the flap being moved depending on the operating state of the turbine engine. A radial vane of this type comprising a flap makes it possible to keep a leading edge oriented in an identical manner for each operating state, only the trailing edge being movable for precisely orienting the air flow on the movable fan.

Preferably, the cross-sectional area of the movable flap increases over its length from its root towards its tip so as to allow the circulation of an air flow in the secondary duct to be blocked while allowing an air flow to circulate in the primary duct. Therefore, the variable-pitch radial vanes allow an air-brake function to be provided, while allowing air to be fed to the turbine engine.

Advantageously, said first and second control rings are movably mounted in rotation about a longitudinal axis of the turbine engine, on the same fixed casing which extends radially on the inside or on the outside of the radial vanes.

Preferably, the assembly of connecting rods is mounted on the fixed casing and, since the connecting rods of said assembly are articulated successively in pairs about substantially radial hinge pins, a first connecting rod is movably mounted in rotation about a first and a second substantially radial pivot pin, the first pivot pin being mounted on said first control ring and the second pivot pin being configured to be positioned independently of the position of the first control ring, and a second connecting rod is pivotally mounted on the first connecting rod about a first hinge pin which is positioned at a first distance from said second pivot pin, which distance is determined for each vane.

In the following description, the term "hinge pin" for a connecting rod refers to a pin which is pivotally connected to another connecting rod of the connecting-rod assembly and moves therewith, and so as to be differentiated therefrom, the term "pivot pin" for a connecting rod refers to a pin which is pivotally connected to an element outside the connecting-rod assembly, for example a casing, a vane or a control ring.

Pivotally mounting the first connecting rod about a pin which is independent of the first control ring makes it possible to convert the movement of the first control ring relative to the other pivot pin of the first connecting rod into a movement of the second connecting rod using an amplification factor which is directly linked to the position of the articulation thereof on the first connecting rod. This movement of the second connecting rod may then be transmitted to the radial vane in a manner in which it is substantially decoupled from the movement of the second ring.

Moreover, the system of connecting rods can be adapted to different cases, which are described above, of variable-pitch vanes, integral vanes or vanes having a movable flap.

Advantageously, said first hinge pin is positioned between the first and second pivot pins.

Moreover, this first distance makes it possible to adjust a different amplification factor of the variations in pitch for each radial vane, depending on the movements of the first control ring.

Advantageously, modifiable connection means make it possible to move the first hinge pin on the first connecting rod during a maintenance or adjustment operation on the turbine engine.

Preferably, for each vane in said at least one row, a pivot connection is arranged to connect said vane to said connecting-rod assembly about a third, substantially radial pivot pin which is connected to the vane and offset along the longitudinal axis relative to a pitch pin of said vane.

Here, "pitch pin" means a substantially radial pin about which the entire radial vane, or a movable flap thereof, rotates in order to orient itself according to the pitch angle. By means of a levering effect, this makes it possible to convert the movement of the fourth connecting rod into a variation of the pitch angle.

This assembly converts the movement of the third pivot pin, caused by a movement of the first or the second control ring into a variation in pitch of the vane in a simple manner.

According to a preferred embodiment, the second pivot pin is mounted on the stator casing and a third connecting rod in said assembly is movably mounted in rotation about a fourth, substantially radial pivot pin which is mounted on said second control ring.

Pivotally mounting the first connecting rod on the fixed casing gives a determined amplification ratio between the movement of the first control ring and the fixed point of articulation on said first connecting rod, whereas the articulation between the first connecting rod and the third connecting rod by means of the second connecting rod gives the degree of freedom which is thus necessary so that the second control ring can independently act on the connecting-rod assembly.

Advantageously, the fourth pivot pin is positioned on the third connecting rod between a second hinge pin having the second connecting rod and a third hinge pin having a fourth connecting rod, said fourth connecting rod being pivotally mounted about the third pivot pin.

In this assembly, interposing the third connecting rod between the first connecting rod and the fourth connecting rod makes it possible to decouple the influence of the movement of the first ring relative to the position of the second ring, driving the fourth pivot pin on which the third connecting rod pivots. The first control ring may thus be assigned to azimuth adaptations of the pitch of the vanes, as stated above, whereas the second ring may actuate the third connecting rod in order to adjust the pitch of the vanes in a substantially uniform manner in azimuth depending on the flight modes. For example, in the case of a stator which is upstream of a fan, the first ring may cause variations in pitch of the vanes in order to take into account certain inhomogeneous azimuth variations in the inflow, for example a crosswind.

Preferably, for each vane, the fourth pivot pin is substantially in the same plane, which is perpendicular to the longitudinal axis, as a pitch pin of the vane.

Advantageously, the first and third connecting rods are substantially parallel to the longitudinal axis for at least one position of the control rings.

Yet more preferably, the second and fourth connecting rods are substantially perpendicular to the longitudinal axis for at least one position of the control rings.

In another embodiment, for at least one vane in said at least one row, the second pivot pin is mounted on the second control ring and the second connecting rod of said assembly is pivotally mounted about the third pivot pin.

In this variant, for example for a stator which is upstream of a fan, it is the relative movement of the first ring relative to the second which can cause variations in pitch which are differentiated depending on the azimuth of each radial vane in order to take into account inhomogeneous variations in the inflow, whereas shared movement of the first and the second ring can adjust the pitch of the radial vanes in a substantially uniform manner in azimuth for adaptations depending on the flight modes.

Advantageously, for a turbine engine of this type, said assemblies of connecting rods are arranged such that the ratios between the variation of the pitch angle caused by a single movement of the first control ring and the variation of the pitch angle caused by a single movement of the second control ring are different for at least two of said radial vanes.

The invention also relates to a method for adjusting means for individually regulating the pitch of variable-pitch fixed radial vanes in a turbine engine as described above, during a maintenance or adjustment operation on the turbine engine, comprising a preliminary step consisting in determining, for each radial vane, values for said first distance on the first connecting rod and for a second distance defined by the gap between the third pivot pin and an hinge pin of the connecting rod of said assembly, which rod is mounted on said third pivot pin, said values allowing a law for a given change in the pitch angles to be obtained depending on the change in the positions of the first and the second control ring, the method then comprising a step a) consisting in adjusting the second distance for at least one radial vane, and/or a step b) consisting in adjusting the first distance for at least one radial vane.

DESCRIPTION OF THE DRAWINGS

The invention will be better understood upon reading the following description, which is given purely by way of example, and with reference to the accompanying drawings, in which:

FIG. 6 is a schematic sectional view of the radial stator vanes when they are provided with an adaptive pitch;

FIG. 7A is a schematic view of a plurality of pitch positions of an integral radial stator vane according to the invention having a movable body;

FIG. 7B is a schematic view of a plurality of pitch positions of an integral radial stator vane according to the invention having a fixed body and a movable flap;

It should be noted that the drawings disclose the invention in a detailed manner in order to carry out the invention, and said drawings can of course serve to give a better definition of the invention where appropriate.

DESCRIPTION OF ONE OR MORE EMBODIMENTS

Figure 1:
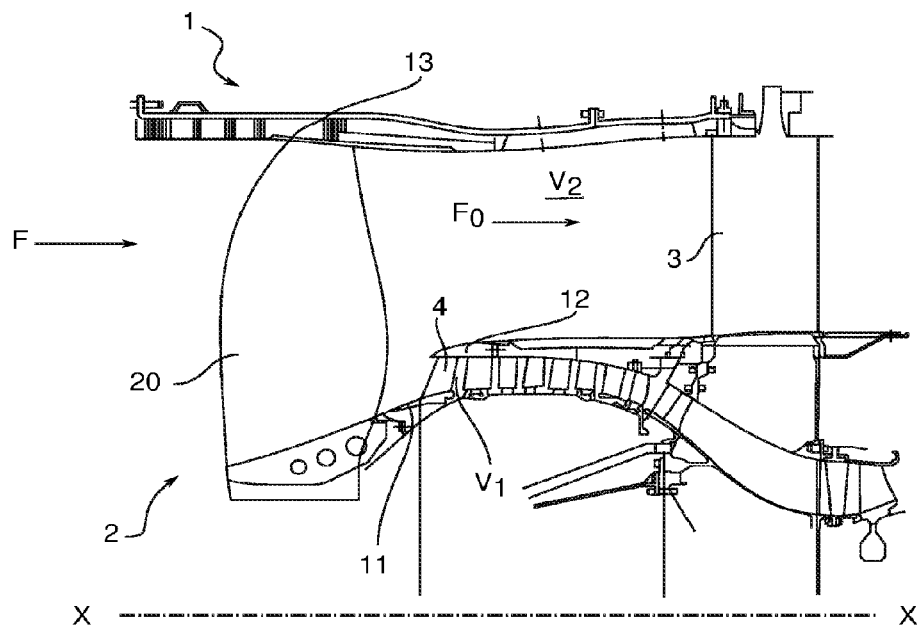
FIG. 1 is a section through a bypass turbine engine according to the prior art.
Figure 2:
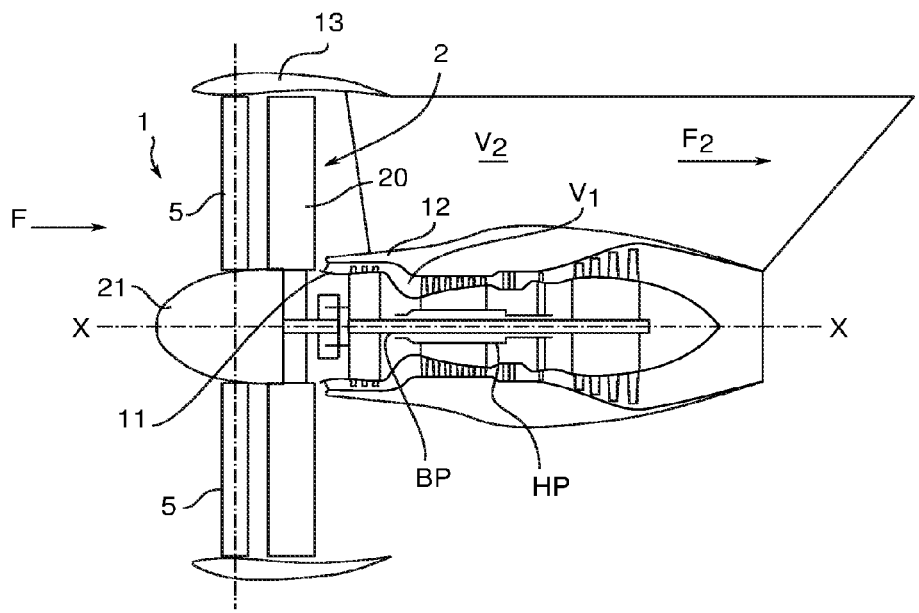
FIG. 2 is a section through a bypass turbine engine according to the invention.

With reference to FIG. 2, which is a schematic view of a turbine engine according to the invention for an aircraft, the turbine engine 1 extends axially along an axis X-X and comprises an inner casing 11, an inter-duct casing 12 and an outer casing 13 so as to define a primary duct V1 between the inter-duct casing 12 and the inner casing 11, and a secondary duct V2 between the inter-duct casing 12 and the outer casing 13. In other words, the secondary duct V2 and the primary duct V1 are annular and are separated by the inter-duct casing 12.

In this example, the turbine engine 1 comprises a low-pressure rotary shaft BP and a high-pressure rotary shaft HP, the low-pressure rotary shaft BP comprising, at the upstream end, a movable fan 2 comprising radial blades 20 of which the free ends face the outer casing 13 of the turbine engine so as to compress an incident air flow F at least in the secondary duct V2. In the example in FIG. 2, the movable fan 2 accelerates an air flow in the secondary duct V2 and in the primary duct V1.

The air flow circulating in the primary duct V1 is conventionally compressed by compressor stages before entering the combustion chamber. The combustion energy is recovered by turbine stages, which drive the compressor stages and the upstream movable fan 2 stage. The air flow circulating in the secondary duct V2 for its part is involved in providing the thrust of the turbine engine 1. In this example, the turbine engine 1 has a high bypass ratio, that is to say greater than 15. In order to provide the desired thrust with a turbine engine having a high bypass ratio, it is advantageously possible to reduce the rotational speed of the movable fan 2 to speeds of less than 340 m/s, for example of approximately 250 m/s to 300 m/s.

According to the invention, the turbine engine 1 comprises a plurality of fixed radial vanes or stator vanes 5 mounted upstream of the movable fan 2 so as to deflect the incident axial air F prior to it being axially rectified by the movable fan 2 in the secondary duct V2, as shown in FIG. 2. By way of example, the turbine engine comprises at least twenty circumferentially distributed radial stator vanes 5. With reference to FIG. 2, the radial stator vanes 5 extend in the same plane which is transverse to the axis of the turbine engine 1 between the inner casing 11 and the outer casing 13 of the turbine engine 1, so as to entirely deflect the incident axial flow F received by the turbine engine 1.

In this example, the turbine engine 1 comprises, upstream of the fan 2, a fixed axial cone 21 which is rigidly connected to the inner casing 11 and in which the plurality of radial stator vanes 5 are mounted. Preferably, the axial distance between the plurality of radial stator vanes 5 and the movable fan 2 is between 0.1 and 10 times the mean chord of a radial stator vane so as to optimise the rectification. Advantageously, this allows the distance between the radial stator vanes 5 and the movable fan 2 to be reduced in order to form a more compact turbine engine. In addition, owing to the compactness of the turbine engine 1, said engine may integrate a nacelle having reduced dimensions in place of the outer casing 13, that is to say the fan casing.

Figure 3A:
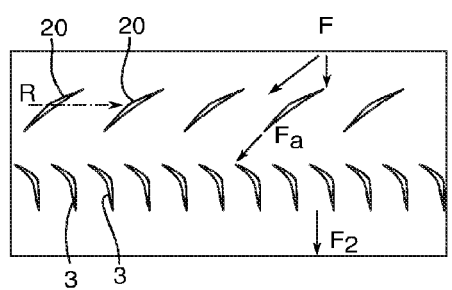
FIG. 3A is a schematic sectional view of the fan blades and of the fixed radial vanes or stator vanes for a turbine engine according to the prior art.

In the prior art, as shown in FIG. 3A, the incident axial air flow F received by the turbine engine 1 is first compressed by the blades 20 of the fan 2 in rotation in the direction R so that the deflected flow Fa has an axial and a tangential component. Then, the deflected flow Fa is axially rectified by radial stator vanes 3 of the OGV type, downstream of the movable fan 2, so that the air flow F2 circulating in the secondary duct V2 is oriented axially, as shown in FIG. 3A.

Figure 3B:
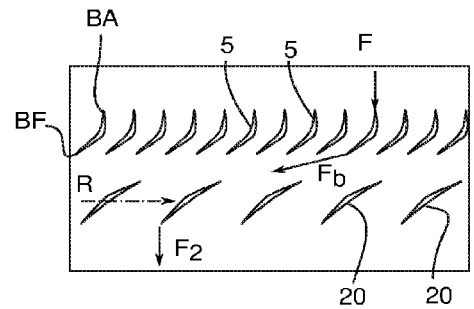
FIG. 3B is a schematic sectional view of the fan blades and of the fixed radial vanes or stator vanes for a turbine engine according to the invention.

According to the invention, the presence of radial stator vanes 5 upstream of the fan 2 allows the incident air flow F to be deflected prior to it being compressed by the movable fan 2. In fact, as shown in FIG. 3B, the plurality of radial stator vanes 5 mounted upstream of the movable fan 2 allow the incident air flow F to be deflected so that the deflected air flow Fb has an axial and a tangential component. Then, the deflected air flow Fb is axially rectified by the movable blades 20 and compressed so that the air flow F2 circulating in the secondary duct V2 is oriented axially, as shown in FIG. 3B. Advantageously, the air flow F2 output from the fan 2 only predominantly has an axial component.

In this example, each radial stator vane 5 has an elongate, preferably three-dimensional, shape, extending in a radial direction. Each radial stator vane 5 has a substantially constant chord over its length. Preferably, each radial stator vane 5 has an aerodynamic body having a leading edge BA and a trailing edge BF so as to, on one hand, deflect any incident air flow F received by the radial stator vane 5 and, on the other hand, accelerate the incident air flow in a continuous manner to maintain laminar flow. Preferably, the profile allows an acceleration of the incident air flow over at least 75% of the chord of the vane.

The radial stator vane 5 has a root mounted in the inter-duct casing 12 and a tip mounted in the outer casing 13 by connection means of the nut and bolt type, but other connection means may of course also be suitable.

According to the invention, the radial stator vanes 5 have a variable pitch so as to allow optimum deflection of the incident air flow F for each operating state of the turbine engine (take-off TO (FIG. 4), cruising C (FIG. 3B) or braking L (FIG. 5)). "Variable pitch" means the orientation of the stator vane 5 or a part of the stator vane 5 around a substantially radial axis.

Preferably, the pitch angle $\theta$ is defined by (passive or active) regulation depending on the operating state of the turbine engine 1. In this example, the pitch angle $\theta$ is determined by a computer on board the turbine engine and then communicated to an actuating device which modifies the pitch of the vane during operation of the turbine engine 1. By way of example, the actuating device comprises an actuator which moves a pitch wheel to which the radial stator vanes 5 are connected by a plurality of connecting rods. The actuating device could of course be in various different forms.

With reference to FIG. 3B, the pitch angle during cruising operation of the turbine engine 1 is determined depending on the rotational speed of the fan 20 during cruising, so that the downstream air flow F2 circulates axially in the secondary duct V2 to provide optimum thrust. In this example, the trailing edge BF of the radial stator vanes 5 is directed obliquely relative to a radial plane, as shown in FIG. 3B. In the following, the cruising pitch angle $\theta_C$ is used as a reference pitch angle and is shown by dotted lines in FIGS. 4 to 6.

Figure 4:
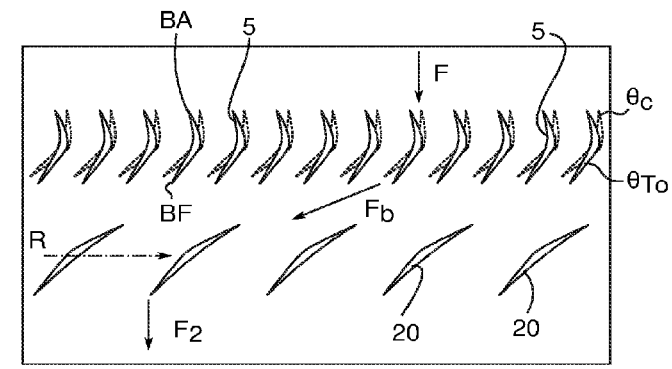
FIG. 4 is a schematic sectional view of the radial stator vanes during take-off.

With reference to FIG. 4, during take-off, the turbine engine 1 requires a large amount of air. For this purpose, the pitch angle $\theta_{TO}$ during take-off is adapted to promote axial circulation of the air flow Fb deflected by the radial stator vanes 5. In this example, the trailing edge BF of the radial stator vanes 5 is increased, that is to say brought closer to the axial position, in order to reduce the initial deflection, as shown in FIG. 4. Therefore, the incident air flow F is less deflected by the radial stator vanes 5, and this promotes a high flow rate of air for feeding the secondary duct V2.

Figure 5:
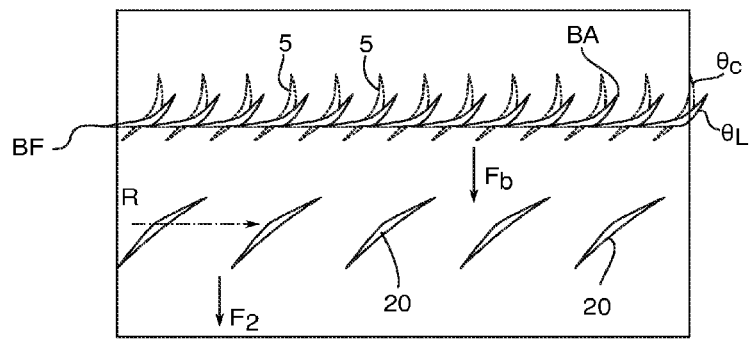
FIG. 5 is a schematic sectional view of the radial stator vanes during thrust inversion.

With reference to FIG. 5, when the aircraft brakes and in order to ensure thrust inversion, the turbine engine 1 requires a low amount of air. For this purpose, the pitch angle $\theta_L$ is adapted to limit the axial circulation of the air flow Fb deflected by the radial stator vanes 5. In this example, the trailing edge BF of the radial stator blades 5 is directly circumferentially, that is to say towards the plane which is transverse to the axis of the turbine engine as shown in FIG. 5, in order to limit (or stop) the amount of air provided to the movable fan 2. The radial stator vanes 5 having such a pitch angle $\theta_L$ further allow a planar transverse surface to be formed which comes up against the incident air flow F during braking. In other words, the radial stator vanes 5 form an air brake, which is very advantageous and avoids the use of auxiliary devices which are heavy and large (thrust inverter, etc.).

Preferably, when the stator vanes 5 are provided with a pitch for the braking of the aircraft, an incident air flow F can always circulate in the primary duct V1 in order to allow the turbine engine 1 to operate. Such a function is, for example, achieved by means of three-dimensional radial stator vanes 5 which cooperate for the pitch angle $\theta_L$ in order to form a plane for blocking the secondary duct V2, while allowing the air flow to circulate in the primary duct V1.

According to an aspect of the invention, each radial stator vane 5 does not have the same pitch angle $\theta$. With reference to FIG. 6, the pitch of the radial stator vanes 5 is produced adaptively so that the air flow F2 circulating in the secondary duct V2 extends axially so as to limit surge phenomena in the turbine engine.

Preferably, the turbine engine 1 comprises individual-regulating means. Said regulating means preferably comprise means for individually adjusting the pitch of the vanes, which are controllable, and electronic means which are capable of detecting, for example, properties of the air-flow in the secondary duct and of sending controls to the adjustment means. Some examples of means for individually adjusting the pitch of the vanes which are adapted to take account of these controls are set out in the remainder of the application. However, electronic control means which are normally designed by a person skilled in the art may be installed in said regulating means, and they are not described in detail in the remainder of the application.

The means for individually regulating the pitch of the radial stator vanes 5 used in the invention allow an adaptive pitch to be provided depending on the configuration of the turbine engine 1, for example if there is a strut 6 downstream of the movable fan.

As shown in FIG. 6, when the turbine engine comprises elements which limit the circulation of air downstream of the fan 2, the pitch angle θ of the stator vanes 5, which are aligned substantially longitudinally with these elements, is adapted. In fact, since the stator vanes 5 produce tangential deflection of the incident air flow, the vanes affected by an adaptive pitch depend on the standard pitch angle θ.

By way of example, the radial stator vane 5 which is aligned substantially longitudinally with a strut 6 of the turbine engine 1 has a pitch angle θ' which is different from that of the pitch angles θ of the other radial stator vanes 5. In fact, the pitch angle θ' is reduced to allow a greater amount of air to circulate in the turbine engine 1 in order to compensate the disruption from the strut 6. In other words, despite the presence of the strut 6, the axial air flow F2 circulating in the secondary duct V2 is homogenous downstream of the fan.

Moreover, the regulating means allow the means for individually adjusting the pitch of the radial stator vanes to be controlled depending on whether heterogeneity of the air flow in the secondary duct V2 is detected. Therefore, if the pilot or an on-board computer of the aircraft on which the turbine engine is mounted detects such heterogeneity, the regulating means can control the adjustment means in order to compensate this heterogeneity. For example, if the upstream flow is distorted (crosswind or boundary layer ingestion), the air flow in the secondary duct V2 downstream of the fan is homogenous owing to the adaptation. Such a circumferential adaptive pitch advantageously makes it possible to limit the risks of disengagement of or a surge in the turbine engine 1, and this improves the performance and the safety of said engine.

The pitch of the radial stator vanes 5 may be produced individually or in a grouped manner, for example a plurality of consecutive vanes having the same pitch. In other words, the stator vanes are provided with a pitch "block by block".

A plurality of embodiment of the means for adjusting the pitch of the vanes for such a regulating means are described hereinafter.

According to a first embodiment, each radial stator vane 5 has an integral body which is movable in rotation about a radial axis (FIG. 7A). Therefore, depending on the operating state of the turbine engine 1, the entire radial stator vane 5 is oriented about its axis of extension in order to have a pitch in accordance with the cruising pitch angle $\theta_C$, the take-off pitch angle $\theta_{TO}$ or the pitch angle when slowing down $\theta_L$.

In this first embodiment, the means for variably setting the pitch of the radial stator vanes 5 are preferably located on one of the fixed structures, the outer casing 13 or the fixed axial cone 21, holding the vanes 5.

A preferred embodiment is described hereinafter in which said means are located on the outer casing 13, without excluding the possibility of them being located on the fixed axial cone 21.

Figure 10:
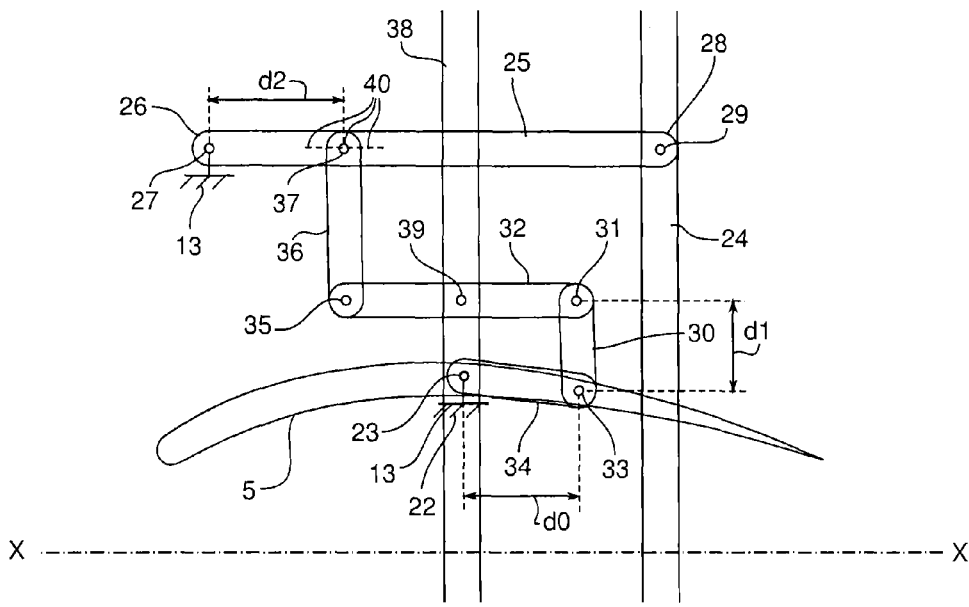
FIG. 10 is a schematic view, radially from above, of a first embodiment of a radial stator vane and means for adjusting its pitch according to the invention.

With reference to FIG. 10, each radial stator vane 5 is mounted in rotation about a substantially radial pitch pin 23 on a pivot means 22 which is rigidly connected to the outer casing 13, the pitch pin 23 in this case opening out radially on the outside of the casing 13. The pitch pins 23 of the radial vanes (5) are positioned in the same plane, which is perpendicular to the longitudinal axis X-X of the turbine engine.

In this embodiment, a first control ring 24 and a second control ring 38 are movably mounted in rotation relative to the axis X-X of the turbine engine, on the radially outer wall of the casing 13. The first control ring 24 is mounted downstream of the pitch pins 23 of the radial vanes 5, whereas the second control ring 38 is, in this case, positioned substantially in the same plane, which is perpendicular to the axis X-X, as the pitch pins 23 of the radial vanes 5.

Moreover, in this embodiment, each radial vane 5 is connected to the control rings 24, 28 by an assembly of four connecting rods 25, 36, 32 and 30 which are successively articulated to one another in pairs so as to pivot about substantially radial hinge pins 37, 35, 31, 33.

A first connecting rod 25 is mounted, in the region of one of its ends 28, in rotation about a first substantially radial pivot pin 29 which is rigidly connected to the first control ring 24, and, in the region of its other end 26, in rotation about a second substantially radial pivot pin 27 which is mounted on the radially outer wall of the outer casing 13.

The first pivot pin 29 may be, for example, a pin 29 which is inserted into a longitudinal slot at the end 28 of the connecting rod 25. In this way, when the first control ring 24 rotates, the movement of the pin 29 can drive the connecting rod 25 in rotation about the second pivot pin 27 at the other end 26 thereof.

The second pivot pin 27 of the first connecting rod 25 is offset in azimuth relative to the pitch pin 23 of the vane 5 and, in this case, upstream thereof.

In this case, the first connecting rod 25 is substantially aligned with the longitudinal axis X-X, and is therefore substantially perpendicular to the first control ring 24 for an average position $A_0$ of said ring corresponding to an average pitch of the vane 5.

A second connecting rod 36 is pivotally mounted on the first connecting rod 25 about a first hinge pin 37 between the two connecting rods. In this case, said first hinge pin 37 of the second connecting rod 36 on the first connecting rod 25 is at a distance d2 from the second pivot pin 27 of the first connecting rod 25 which positions said pivot pin upstream of the pitch pin 23 of the radial vane 5.

The second connecting rod 36 is articulated so as to pivot together with a fourth connecting rod 32 about a second hinge pin 35 which is close to one of its ends.

In this case, the third connecting rod 32 itself is articulated so as to pivot about a third hinge pin 31 together with a fourth and final connecting rod 30.

The fourth connecting rod 30 is articulated, close to its end opposite the third hinge pin 31, so as to pivot about a third pivot pin 33 mounted on the vane 5. The third pivot pin 33 is positioned at a non-zero distance d0 from the pitch pin 23 of the vane 5 so as to provide a lever arm which allows the movement of the fourth connecting rod 30 to be converted into a rotational movement of the vane 5, and therefore into a modification of its pitch angle θ. This movement can be ensured by a connecting rod 34 which is fixed relative to the vane, or by any other means. In this case, the third pivot pin 33 is positioned substantially on the chord of the vane 5, without this example having a limiting effect. In the example shown, the third pivot pin 33 is positioned downstream of the pitch pin 23 of the radial vane 5.

Moreover, the third connecting rod 32 is articulated in rotation about a fourth pivot pin 39, which is substantially radial and is rigidly connected to the second control ring 38. As is the case for the connection of the first connecting rod 25 to the first control ring 24, the fourth pivot pin 39 may be, for example, a pin 39 which is inserted into a longitudinal slot in the connecting rod 25. In this way, when the control ring 38 rotates, the movement of the pin 39 can drive the connecting rod 25 and make it pivot.

In this case, the fourth pivot pin 39 passes substantially through the centre of the third connecting rod 32, midway between the second 35 and third hinge pins.

In this case, the geometry of the different connecting rods 25, 36, 32, 30 is such that, for an average position $G_0$ of the second control ring 38, the first connecting rod 25 being substantially parallel to the axis X-X, the third connecting rod 32 is also substantially parallel to the axis X-X, whereas the second 36 and fourth 30 connecting rods are substantially perpendicular to the axis X-X.

The operation of the adjustment means in response to the movements A and G of the first 24 and second 38 control rings will now be described in detail with reference to FIGS. 11A and 11B.

Figures 11A, 11B:
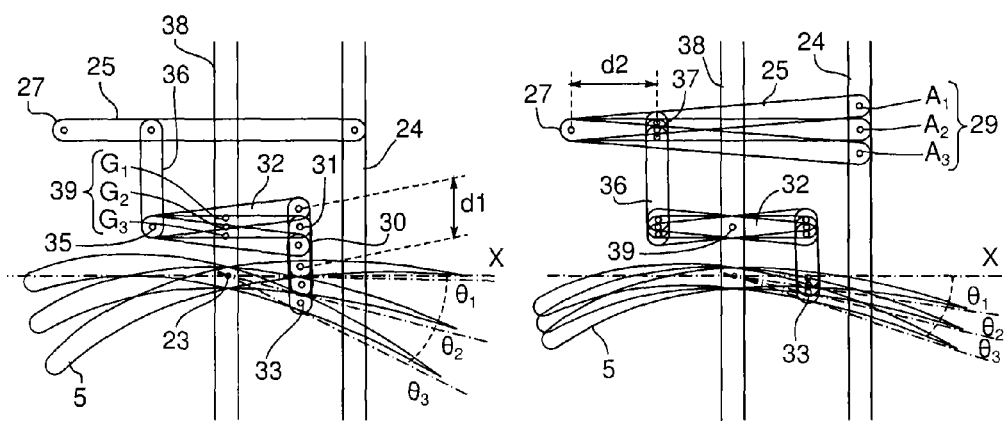
FIG. 11A is a schematic view of a plurality of pitch positions of a vane shown in FIG. 10, for different movements of a first control ring.
FIG. 11B is a schematic view of a plurality of pitch positions of a vane shown in FIG. 10, for different movements of a second control ring.

In FIG. 11A, the first control ring 24 is held in a fixed manner around an average position $A_0$. However, three positions $G_1, G_2, G_3$ of the second control ring 38 are shown.

In this configuration, the first connecting rod 25 is held in a fixed manner by the first control ring 24 and it holds the second connecting rod 36 in a substantially fixed manner. In these conditions, driving the centre of the third connecting rod 32 by means of the third pivot pin 39, which is mounted on the second control ring 38, causes this connecting rod to move in rotation about the second hinge pin 35. When approximating small movements, this causes the fourth connecting rod 30 to move in translation perpendicularly to the axis X-X, and therefore causes a corresponding movement of the third pivot pin 33, which is rigidly connected to the vane 5, and causes the pitch angle of the vane 5 to be positioned at three corresponding values $\theta_1, \theta_2$ and $\theta_3$.

It may be noted here that, on the third connecting rod 32, the relative position of the second hinge pin 35 and of the fourth pivot pin 39 amplifies the movements G of the second control ring 38 in the region of the third pivot pin 33, on the vane 5. However, for small movements, the dependency of the pitch $\theta$ of the vane 5 on the movements G of the second control ring 38 may be considered to be linear. This becomes:

$$\theta = K \cdot G. \quad (1)$$

At this point, it may also be noted that a first parameter is used for adjusting the control for the pitch of the vane 5 by varying the distance d1 between the third hinge pin 31 and the third pivot pin 33, on the fourth connecting rod 30. This distance d1 has an immediate effect, as can be seen from FIG. 10, on the pitch angle $\theta$ of the vane 5 for a given position G of the second control ring 38. This distance d1 may be modified, for example, either by changing the fourth connecting rod 30 or by installing connection means on the fourth connecting rod 30 which allow the third pivot pin 33, for example, to be moved on said connecting rod.

Depending on the selected length, the origin of the pitch angle $\theta$ of the vane 5 is therefore moved. This therefore becomes, in order to represent the variation in pitch as a function of the movement of the second control ring 38:

$$\theta = K \cdot G + \theta_0. \quad (2)$$

Where $\theta_0$ is the pitch value obtained with the length d1 of the second connecting rod 30 for an average position of the control ring 38.

Where $\theta_0$ is the pitch value obtained with the length d1 of the second connecting rod 30 for an average position of the control ring 38.

It may also be noted that it is possible to influence the length of the second connecting rod 36 in order to modify the initial position of the third connecting rod 32, and, therefore, the value $\theta_0$ of the initial pitch.

In FIG. 11B, it is the second control ring 38 that is held in a fixed manner around an average position $G_0$. However, three positions $A_1, A_2, A_3$ of the first control ring 24 are shown.

In this configuration, the first connecting rod 25 pivots about the second pivot pin 27 which is fixed to the casing 13. By means of a levering effect, the movement of the first hinge pin 37 is proportional to the movement A of the first control ring 24, substantially within the ratio between the distance d2 and the length of the first connecting rod 25. When approximating small movements, this movement is perpendicular to the axis X-X in this case.

Since, in this configuration, the third connecting rod 32 pivots about the fourth pivot pin 39, which is connected to the second control ring 38, the movement of the first hinge pin 37 drives a similar movement, which is perpendicular to the axis X-X and in the opposite direction, of the third pivot pin 33, which is connected to the vane 5. In this case, since the third connecting rod 32 rotates substantially in its centre about the fourth pivot pin 39, which is held by the second control ring 38, said movements are symmetrical.

The movement of the first control ring 24 into three positions $A_1, A_2, A_3$ therefore causes the pitch of the vane 5 to be positioned at three corresponding values $\theta_1, \theta_2$ and $\theta_3$. For small movements, the dependency of the pitch $\theta$ of the vane 5 on the movements A of the first control ring may be considered to be linear. This becomes:

$$\theta = Amp \cdot A. \quad (3)$$

Figure 12:
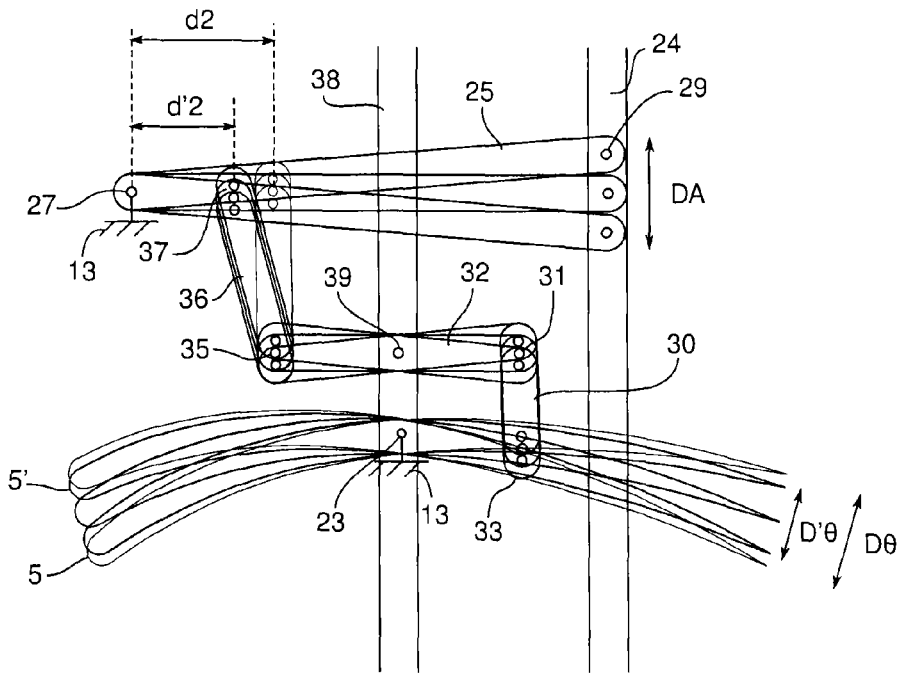
FIG. 12 is a schematic view of a plurality of pitch positions of a vane shown in FIG. 10, for different geometric parameters in the adjustment means when one of the control rings moves.

At this point, it may also be noted that a second parameter is used for adjusting the control for the pitch $\theta$ by varying, on the first connecting rod 25, the length d2 between the second pivot pin 27, on the casing 13, and the first hinge pin 37. In fact, as stated above, the movement of the first hinge pin 37, therefore that of the third pivot pin 33, which is connected to the vane 5, is proportional to this distance d2. The factor Amp in the linear relationship between the pitch and the movement A of the control ring 24 is therefore substantially proportional to this distance d2. FIG. 12 shows this adjustment factor, and it can be seen therefrom that the variations D'$\theta$ in pitch for the distance d'2 are smaller than the variations D$\theta$ in pitch for another distance d2, which is longer, together with the same movements DA of the first control ring 24.

One way of adjusting the distance d2 is to use pivoting connection means 47, as shown in FIG. 10, which are configured so that the first hinge pin 37 can be moved on the first connecting rod 25. Said means may be, for example, successive holes in the first connecting rod 25 into which an hinge pin may be inserted for determined positions. Said means may also be a means mounted on a collar surrounding the connecting rod 25 for a continuous movement. This may again be the fact of changing the connecting rod 25 depending on the selected length d2.

Moreover, in this case, the fact that the first connecting rod 25 is substantially parallel to the axis X-X and that the fourth connecting rod 30 is substantially parallel to the control rings 24, 38 for an average control position allows the effects of the two parameters d1, d2 to be decoupled for small movements, as a first approximation. For example, an average pitch $\theta_0$ of the vane 5 may be adjusted by adjusting the length d1 of the fourth connecting rod 30, and then the amplitude Amp of the variations in pitch may be adjusted depending on movements A of the first control ring 24 by adjusting the distance d2 on the first connecting rod 25 between the second pivot pin 27 and the first hinge pin 37.

Figure 13A:
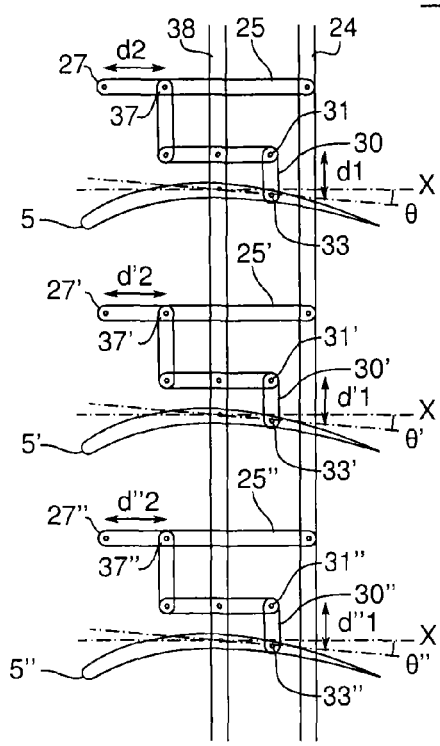
FIG. 13A shows a plurality of successive radial stator vanes equipped with adjustment means, such as those shown in FIG. 10.

As shown in FIG. 13A, the variable-pitch stator vanes 5, 5', 5" may be organised in a grid shape in a conventional manner. In the configuration shown, the geometries of the connecting-rod assemblies connecting the vanes 5, 5', 5" to the first 24 and second 38 control rings are similar.

For small movements, it may therefore be said that the vector $\Theta$ of the pitch angles $\theta$, $\theta'$, $\theta''$ of the vanes 5, 5', 5" is a linear function of the two controls A and G, which are the movements of the two control rings 24, 38:

$$\Theta = \Theta_0 + K \cdot G + \mathrm{Amp} \cdot A \quad (4)$$

If the values of the two parameters d1, d'1, d"2 and d2, d'2, d"2 are adjusted for each connecting rod 5, 5', 5", the coefficients $\Theta_0$, K and Amp are vectors of which the components may vary depending on the vane 5, 5', 5". The vector $\Theta_0$ has, as components, the values of the initial average pitch $\theta_0$ of each vane 5 for a zero average value of the movements of the control rings.

This assembly is justified in particular if the adjustment of the parameters causes the vectors K and Amp not to be colinear. In this case, the two controls are independent and allow the pitch of the radial vanes 5 to be changed in two degrees of freedom. It may thus be conceivable for example to control a pitch of all of the radial vanes 5 using a control G and to control the azimuth variations around this pitch using the other control A.

Figure 13B:
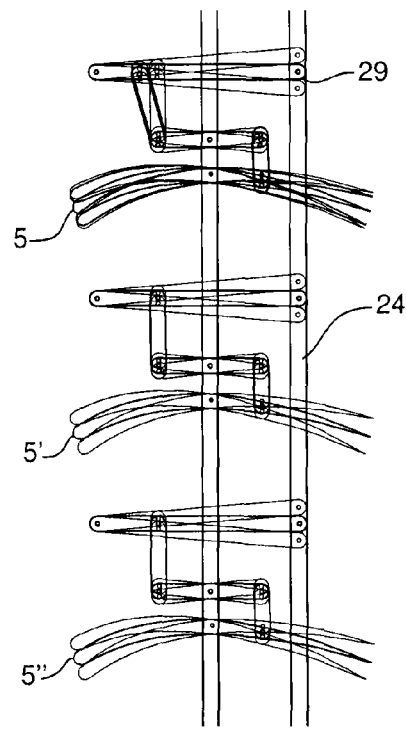
FIG. 13B shows different positions of the vanes from FIG. 13A for different positions of the control rings.

In particular, in the case shown in FIGS. 13A and 13B, the dimensions of the first 25, 25', 25", third 32, 32', 32" and second 36, 36', 36" connecting rods, as well as the position of the third pivot pins 33, 33', 33" on the radial vanes 5, 5', 5", are the same. The same applies to the relative positions of the first 29, 29', 29", second 27, 27', 27" and fourth 39, 39', 39" pivot pins, and to the pitch pins 23, 23', 23" for an average position of the first 24 and the second 38 control ring. FIG. 13B shows the different changes in pitch $\theta$, $\theta'$, $\theta''$ of the vanes 5, 5', 5" shown in FIG. 13A.

In this case, this first distinctive feature leads to the factor K between the control by the second ring 38 and the pitch of each vane 5 being the same. When normalising these variables, the vector K may identified using an identity vector I:

$$\Theta = \Theta_0 + I \cdot G + \mathrm{Amp} \cdot A \quad (5)$$

Moreover, it has been seen above, when approximating small movements, that there is a direct relationship between the initial average pitch $\theta_0$ and the parameter d1, on one hand, and between the amplification factor Amp and the parameter d2, on the other hand, for each vane 5.

A method for adapting this system, for example, to a turbine engine which is subjected to speed variations during flight of the aeroplane on which it is installed by taking into account a crosswind may be achieved simply by associating the second ring 38 with a control of a pitch of all the vanes 5 depending on the speed and by associating the first ring with a control of azimuth corrections depending on the wind direction.

In this case, in order to take into account potential constant singularities, in a first step, the parameter d1 may be adjusted for each vane to define a differentiation of the pitch corrections in azimuth and, in another step, the parameter d2 may be adjusted for each vane, so as to define a vector Amp which is adapted to the correction of this type of distortion.

For example, for an average position $G_0$ of the second control ring 38, a first position $A_1$ of the first control ring 24 corresponding to the differentiated adaptation of the pitch of the vanes to a first type of singularity and a second position $A_2$ of the control ring 24 corresponding to a second type of singularity may be defined. Preferably, these two positions $A_1$ and $A_2$ are selected such that they are close in order to handle small movements. Yet more preferably, said positions are selected so as to surround an average position $A_0$ for which the first 25 and fourth 30 connecting rods form an angle which is close to 90° for the stator vanes 5, 5', 5".

The values of the distances d1, d'1, d"1 and d2, d'2, d"2 are then determined for each radial vane 5, 5', 5" providing the vector components $\Theta_0$ and Amp in the formula (5) making it possible to obtain the desired pitch angles $\theta_1$, $\theta'_1$, $\theta''_1$ for the position $A_1$ and $\theta_2$, $\theta'_2$, $\theta''_2$ for the position $A_2$ of the first control ring 24, the second control ring 38 being in the average position $G_0$.

In subsequent steps, the distance d1, d'1, d"1 is adjusted on the fourth connecting rod 30, 30', 30", and the distance d2, d'2, d"2 is adjusted on the first connecting rod 25, 25', 25", for each radial vane 5, 5', 5" to the values found above. In this case, the term "adjustment" corresponds either to using the adjustment means which were previously installed on the first 25, 25', 25" and fourth connecting rods 30, 30', 30" or installing the first 25, 25', 25" and fourth 30, 30', 30" connecting rods having the required geometry.

Figure 17:
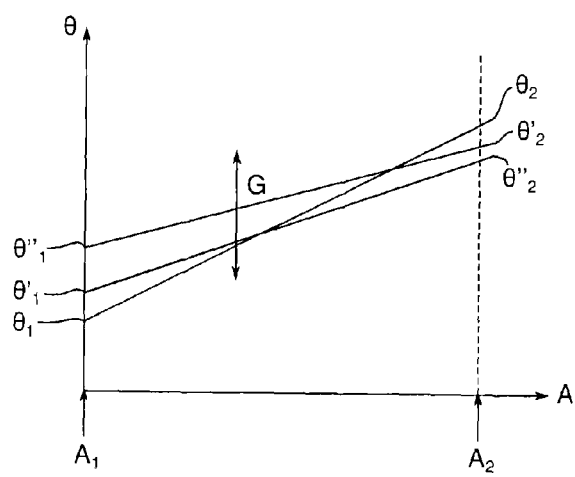
FIG. 17 is a diagram of the change in the pitch of a plurality of vanes, such as those shown in FIGS. 13A and 13B, as a function of the position of the control rings.

When the adjustments are completed, the variations in the pitch angle $\theta$, $\theta'$, $\theta''$ of the vanes 5, 5', 5" follow the result shown in FIG. 17 as a function of the position A of the first control ring 24. The movement G of the second control ring 38 thus corresponds to a vertical translation of the curves in FIG. 15.

Thus, the control A of the first ring 24 may be used together with positive or negative values in the direction of the wind, while maintaining the capacity of the control G of the second ring 38 to adapt to all the flight phases.

The device may also be used to correct distortions due to boundary layer ingestion independently of the flight conditions or operating constraints.

Figure 14:
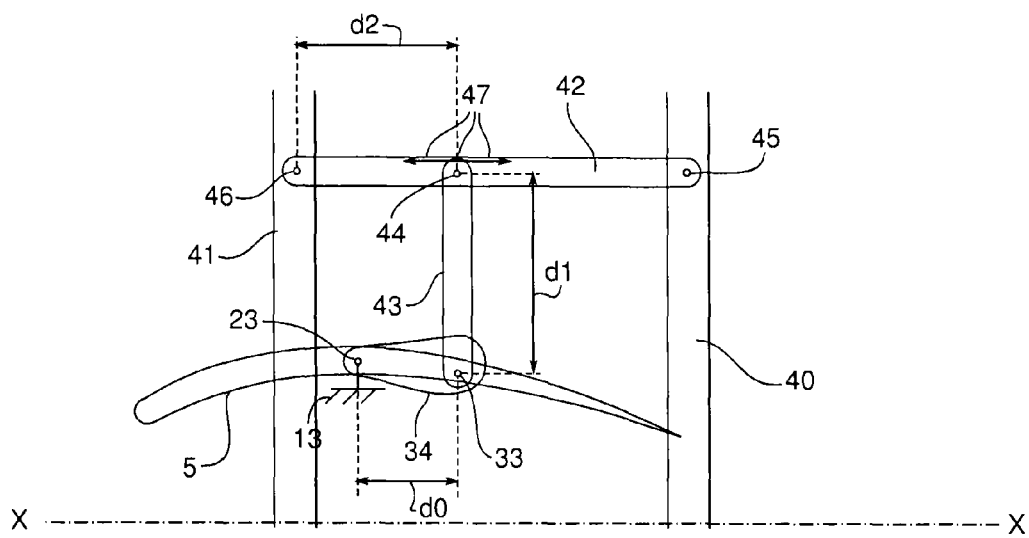
FIG. 14 is a schematic view, radially from above, of a second embodiment of a radial stator vane and means for adjusting its pitch according to the invention.

In a variant of the invention, shown in FIG. 14, the means for individually adjusting the pitch of the vanes always comprise a first control ring 40 and a second control ring 41 which are movably mounted in rotation relative to the axis X-X of the turbine engine, on the radially outer wall of the casing 13. The first control ring 41 is mounted, as above, downstream of the pitch pins 23 of the radial vanes 5. However, in this case, the second control ring 41 is positioned substantially upstream of the pitch pins 23 of the radial vanes 5.

Moreover, in this second embodiment, each radial vane 5 is connected to the control rings 40, 41 by an assembly of two connecting rods 42 and 43 which are articulated to each other about a first and single hinge pin 44 for the substantially radial connecting-rod assembly.

The first connecting rod 42 is mounted, in the region of one of its ends, in rotation about a first substantially radial pivot pin 45 which is rigidly connected to the first control ring 24, and, in the region of its other end, in rotation about a second substantially radial pivot pin 46 which is rigidly connected to the second control ring 41.

For an average position of the two control rings 40, 41, the first connecting rod 42 is in this case substantially parallel to the longitudinal axis X-X and is offset in azimuth relative to the pitch pin 23 of the vane 5.

The second connecting rod 43 is mounted, close to its end opposite said first hinge pin 44, so as to pivot about a third pivot pin 33 which is rigidly connected to the vane 5. As in the preceding embodiment, the third pivot pin 33 is placed at a non-zero distance d0 from the pitch pin 23 of the vane 5, so as to provide a lever arm which allows the movement of the fourth connecting rod 30 to be converted into a rotational movement of the vane 5, and therefore into a modification of its pitch angle θ. In this case, the third pivot pin 33 is also positioned substantially on the chord of the vane 5, without this example having a limiting effect. In the example shown, the third pivot pin 33 is positioned downstream of the pitch pin 23 of the radial vane 5.

In this case, the geometry of the different connecting rods 42, 43, as well as the position of the first 45, second 46 and third 33 pivot pins, and of the first hinge pin 44, is such that, for an average position $G_0$ of the second control ring 41, the first connecting rod 42 being substantially parallel to the axis X-X, the second connecting rod 43 is substantially parallel to the axis X-X.

The operation of the adjustment means in response to the movements A and G of the first 40 and second 41 control rings will now be described in detail with reference to FIGS. 15, 16A and 16B.

Figure 15:
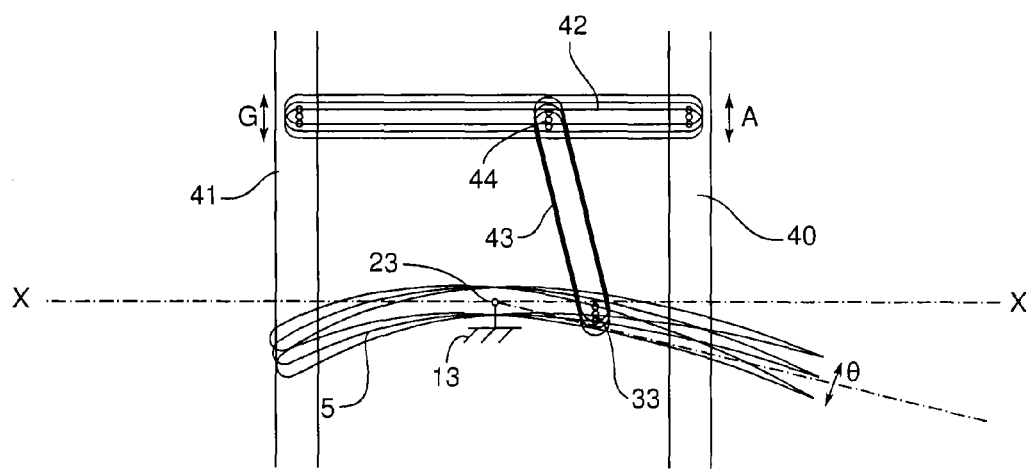
FIG. 15 is a schematic view of a plurality of pitch positions of a vane shown in FIG. 14, for simultaneous movements of the control rings.

In FIG. 15, the first control ring 40 and the second control ring 41 move in the same way.

In this configuration, the first connecting rod 42 and the second connecting rod 43 maintain substantially the same relative position, when approximating small movements. The shared translation of the positions A and G of the two control rings 40, 41 therefore leads to an equivalent translation of the pivot pin 33 on the radial vane 5 and therefore of the positioning of the pitch angle θ of the vane 5.

This becomes:

$$\theta = K \cdot (G+A). \tag{6}$$

At this point, it may also be noted that, as above, a first parameter is used for adjusting the control for the pitch of the vane 5 by varying the distance d1 between the third pivot pin 33 and said first hinge pin 44 on the second connecting rod 43. This distance d1 has an immediate effect, as can be seen from FIG. 15, on the pitch angle θ of the vane 5 for a given position A+G of the first 40 and second 41 control ring. This distance d1 may be modified, for example, either by changing the second connecting rod 43 or by installing connection means on the second connecting rod 43 which allow the third pivot pin 33, for example, to be moved on the second connecting rod 43.

Depending on the selected length, the origin of the pitch angle θ of the vane 5 is therefore moved. This becomes, in order to represent the variation in pitch as a function of the movement of the control rings 40, 41:

$$\theta = K \cdot (G+A) + \theta_0.$$

Where $\theta_0$ is the pitch value obtained with the length d1 of the second connecting rod 43 for an average position of the control rings 40, 41.

Figures 16A, 16B:
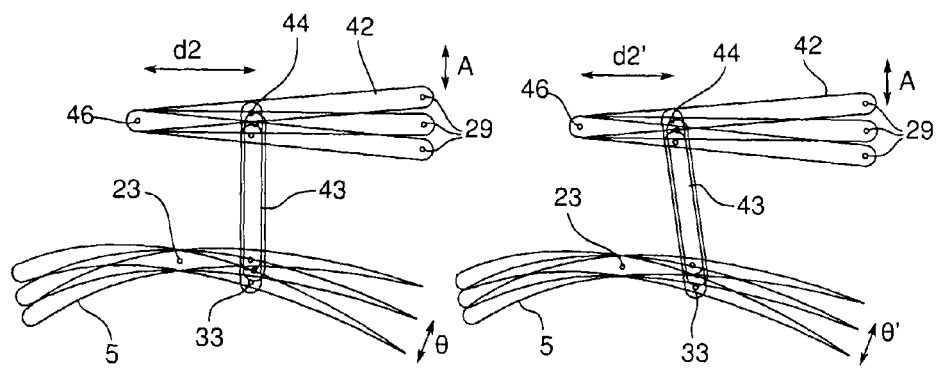
FIGS. 16A and 16B are schematic views of a plurality of pitch positions of a vane shown in FIG. 14, for different movements of a first control ring and different connecting-rod geometries.

In FIG. 16A, the second control ring 41 is held in a fixed manner around an average position. However, the position A of the first control ring 40 varies.

In this configuration, the first connecting rod 42 pivots about the second pivot pin 46 which is held in a fixed manner by the second control ring 41. By means of a levering effect, the movement of said first hinge pin 44 is proportional to the movement A of the first control ring 40, substantially by a factor that is equal to the distance d2 between the second pivot pin 46 and said first hinge pin 44, divided by the distance between the first 45 and second 46 pivot pins. When approximating small movements, this movement is perpendicular to the axis X-X in this case.

Therefore, as in the first embodiment, this becomes:

$$\theta = \text{Amp} \cdot A. \tag{8}$$

As in the first embodiment, a second parameter is used for adjusting the control for the pitch θ by varying, on the first connecting rod 42, the distance d2 between the second pivot pin 46, this time on the second control ring 41, and the first hinge pin 44. FIG. 16B shows this adjustment factor for a distance d'2 which is different from that in FIG. 16A.

The distance d2 may be adjusted on the first connecting rod by means 47 that are similar to those used in the preceding embodiment.

When approximating small movements, this becomes:

$$\theta = \theta_0 + K \cdot (G+A) + \text{Amp} \cdot A \tag{9}$$

In the same conditions for adjusting the parameters d1 and d2, this embodiment makes it possible, as above, to individually modify the pitch of the radial vanes 5 in two separate degrees of freedom, which in this case are the integral movement of the two rings 40, 41 and the relative movement of the first ring 40 relative to the second ring 41.

The two embodiments that are set out provide two ways to decouple the controls of the two control rings. However, these embodiments are not limiting, and other geometries, potentially having three successive connecting rods, may allow the radial vanes 5 to be controlled in two degrees of freedom but with other couplings between the controls A and G.

In a variant, compared with what is shown in FIGS. 10 and 14, the connecting-rod assemblies which have been described for the first or the second variant may be shared by a plurality of successive vanes in the ring. In this case, one of said vanes is connected to the control rings 24, 38 in the above-described manner and drives the others in a known manner by means of a connecting rod. An embodiment of this type may be achieved by lengthening the second connecting rod 30 of the assembly so as to ensure that it is successively articulated to different vanes.

Such a device makes it possible to reduce the mass and complexity of the means for adjusting the pitch of the vanes and is useful in particular if the variations in pitch in azimuth are not very significant for the vanes in question.

Figure 8:
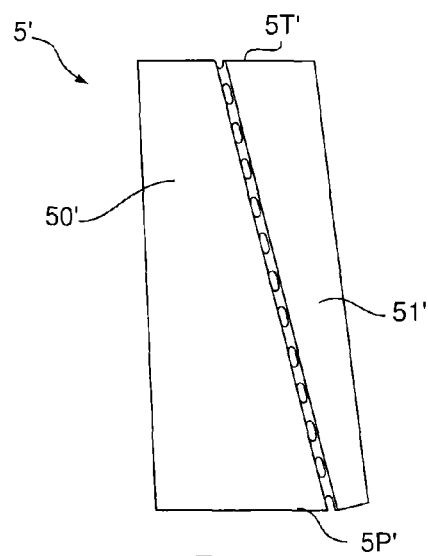
FIG. 8 is a schematic side view of a radial stator vane according to the invention having a fixed body and a movable flap.

According to a second embodiment, each radial stator vane 5' has a fixed body 50' and a movable flap 51', as shown in FIGS. 7B and 8. Preferably, the flap 51' includes the trailing edge BF of the radial vane 5' and is articulated about an axis on the body 50' of the vane 5' which remains fixed. In this example, the movable flap 51' has a cross section which increases over its length, as shown in FIG. 8. Preferably, the cross section increases from the root 5P' of the stator vane 5 to its tip 5T', as shown in FIG. 8, to allow the secondary duct V2 to be blocked in the pitch position $\theta_L$ during landing, while allowing the primary duct V1 to be fed.

The embodiments of the variable-pitch means of the vanes which have been described above can be adapted to this second embodiment in which the pitch pin 33 drives the movable flap 51'. By influencing the articulations between the connecting rods, the invention can be adapted to a rotary shaft of the movable flap 51' which is slightly inclined with respect to the radial direction, as shown in FIG. 8.

Figure 9:
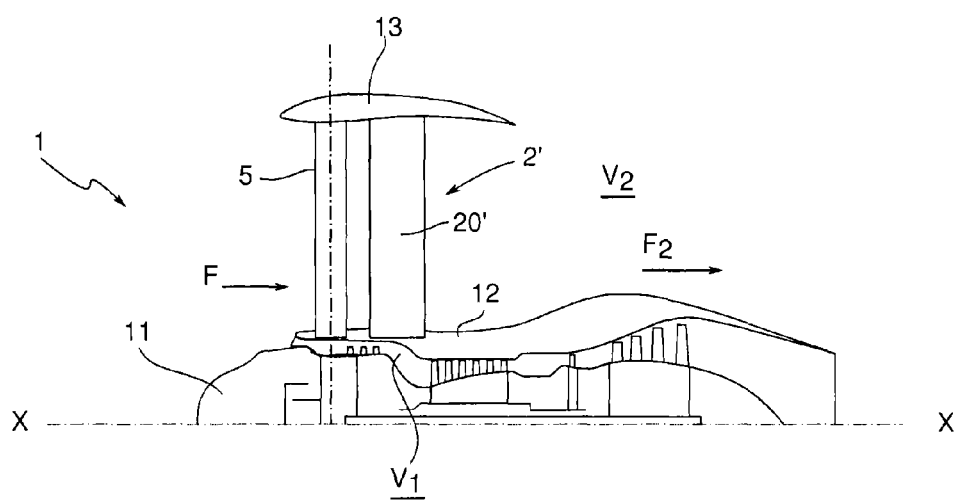
FIG. 9 is a cross section through another embodiment of a bypass turbine engine according to the invention.

According to another embodiment of the invention, with reference to FIG. 9, the movable fan 2' comprises movable blades 20' which extend radially between the inter-duct casing 12 and the outer casing 13 so as to compress an air flow exclusively in the secondary duct V2, the primary duct V1 not receiving an air flow compressed by the movable fan 2'. As a result, the radial stator vanes 5 are mounted between the inter-duct casing 12 and the outer casing 13 in order to deflect the incident air flow F prior to it being compressed by the movable fan 2'. The radial stator blades 5 may of course be integral or may comprise a movable flap in this configuration of the turbine engine 1.

The embodiments of the means for adjusting the variable pitch of the vanes as described for the first embodiment can, in this case, be directly transposed by installing said means either on the outer casing 13 or on the inter-duct casing 12.

The invention claimed is:

1. A bypass turbine engine in which air flows circulate from upstream to downstream, the turbine engine extending axially and comprising:
   an inner casing, an inter-duct casing, and an outer casing so as to define a primary duct between the inter-duct casing and the inner casing, and a secondary duct between the inter-duct casing and the outer casing;
   a rotary shaft comprising, at an upstream end of the rotary shaft, a movable fan comprising radial blades of which free ends face the outer casing of the turbine engine so as to compress an air flow at least in the secondary duct;
   a plurality of variable-pitch radial stator vanes mounted upstream of the movable fan, said variable-pitch radial stator vanes being configured to deflect incident axial air and the movable fan being configured to axially rectify said air deflected in the secondary duct; and
   a regulating system which individually regulates a pitch of the variable-pitch radial stator vanes if heterogeneity of the air flow in the secondary duct is detected,
   wherein the regulating system includes a first control ring, a second control ring, and a connecting rod assembly including a first connecting rod, a second connecting rod, a third connecting rod, and a fourth connecting rod, a first end of the first connecting rod being connecting to the first control ring, a first end of the second connecting rod being connected to the first connecting rod and a second end of the second connecting rod being connected to a first end of the third connecting rod, a second end of the third connecting rod being connected to a first end of the fourth connecting rod, a second end of the fourth connecting rod being connected to one of the variable-pitch radial stator vanes, and the third connecting rod being connected to the second control ring.

2. The turbine engine according to claim 1, wherein the inner casing, the inter-duct casing, and the outer casing are at a radial distance from one another in the turbine engine so as to define a turbine engine having a bypass ratio that is equal to 15.

3. The turbine engine according to claim 1, wherein a rotational speed of the free ends of the blades of the movable fan is less than 340 m/s.

4. The turbine engine according to claim 1, wherein the plurality of variable-pitch radial stator vanes extend in a same plane which is transverse to an axis of the turbine engine.

5. The turbine engine according to claim 1, wherein an axial distance between the plurality of variable-pitch radial stator vanes and the movable fan is between 0.1 and 10 times a mean chord of a variable-pitch radial stator vane.

6. The turbine engine according to claim 1, wherein the blades of the movable fan extend between the inner casing and the outer casing of the turbine engine.

7. The turbine engine according to claim 1, wherein each variable-pitch radial stator vane has an aerodynamic profile so as to accelerate flow of the incident air in accordance with a laminar flow.

8. The turbine engine according to claim 1, wherein each variable-pitch radial stator vane has a body which is movable in rotation about a radial axis.

9. The turbine engine according to claim 1, wherein each variable-pitch radial stator vane has a fixed body and a movable flap.

10. The turbine engine according to claim 1, wherein the plurality of variable-pitch radial stator vanes forms a planar transverse surface at a given pitch position of each of the variable-pitch radial stator vanes.

11. The turbine engine according to claim 1, wherein said first and second control rings are movably mounted in rotation about a longitudinal axis of the turbine engine on one of the inner casing or the outer casing.

12. The turbine engine according to claim 11, wherein the first connecting rod is movably mounted in rotation about a first substantially radial pivot pin and a second substantially radial pivot pin, the first pivot pin being mounted on said first control ring and the second pivot pin being configured to be positioned independently of the position of the first control ring, and the second connecting rod is pivotally mounted on the first connecting rod about a first hinge pin which is positioned at a first distance from said second pivot pin.

13. The turbine engine according to claim 12, wherein said first hinge pin is positioned between the first and second pivot pins.

14. The turbine engine according to claim 12, wherein the second pivot pin is mounted on the second control ring, and wherein the second connecting rod of said connecting rod assembly is pivotally mounted about the third pivot pin.

15. The turbine engine according to claim 12, wherein said the connecting rod assembly is arranged such that ratios between a variation of a pitch angle caused by a single movement of the first control ring and a variation of a pitch angle caused by a single movement of the second control ring are different for at least two of said variable-pitch radial stator vanes.

16. A method for adjusting the pitch of radial stator vanes in a turbine engine according to claim 12, during a maintenance or adjustment operation on the turbine engine, comprising:
   determining values for said first distance on the first connecting rod and for a second distance defined by a gap between the third pivot pin and a hinge pin of the fourth connecting rod, which fourth connecting rod is mounted on said third pivot pin, said values allowing a law for a given change in pitch angles to be obtained depending on a change in positions of the first and the second control ring; and
   adjusting at least one of the first distance and the second distance.

17. The turbine engine according to claim 12, wherein a pivot connection is arranged to connect said one of the variable-pitch radial stator vanes to said connecting rod assembly about a third, substantially radial pivot pin which is connected to the one of the variable-pitch radial stator vanes and offset along the longitudinal axis relative to a pitch pin of said one of the variable-pitch radial stator vanes.

18. The turbine engine according to claim 17, wherein the second pivot pin is mounted on the outer casing and the third connecting rod in said connecting rod assembly is movably mounted in rotation about a fourth, substantially radial pivot pin which is mounted on said second control ring.

19. The turbine engine according to claim 18, wherein the fourth pivot pin is positioned on the third connecting rod between a second hinge pin having the second connecting rod and a third hinge pin having the fourth connecting rod, said fourth connecting rod being pivotally mounted about the third pivot pin.

20. The turbine engine according to claim 18, wherein the fourth pivot pin is substantially in a same plane, which is perpendicular to the longitudinal axis, as a pitch pin of the one of the variable-pitch radial stator vanes.

21. The turbine engine according to claim 18, wherein the first and third connecting rods are substantially parallel to the longitudinal axis for at least one position of the first and second control rings.

22. A bypass turbine engine in which air flows circulate from upstream to downstream, the turbine engine extending axially and comprising:

an inner casing, an inter-duct casing, and an outer casing so as to define a primary duct between the inter-duct casing and the inner casing, and a secondary duct between the inter-duct casing and the outer casing;

a rotary shaft comprising, at an upstream end of the rotary shaft, a movable fan comprising radial blades of which free ends face the outer casing of the turbine engine so as to compress an air flow at least in the secondary duct a plurality of variable-pitch radial stator vanes mounted upstream of the movable fan, said variable-pitch radial stator vanes being configured to deflect incident axial air and the movable fan being configured to axially rectify said air deflected in the secondary duct; and a regulating system which individually regulates a pitch of the variable-pitch radial stator vanes if heterogeneity of the air flow in the secondary duct is detected, wherein each variable-pitch radial stator vanes extends radially between the inter-duct casing and the outer casing to which the variable-pitch radial stator vanes are fixed, and wherein the regulating system includes a first control ring, a second control ring, and at least two rods for connecting said first and second rings to each of said variable-pitch radial stator vanes.

\* \* \* \* \*